March 24, 1936.  G. GRAY  2,035,065
EGG SEPARATOR
Filed June 25, 1934
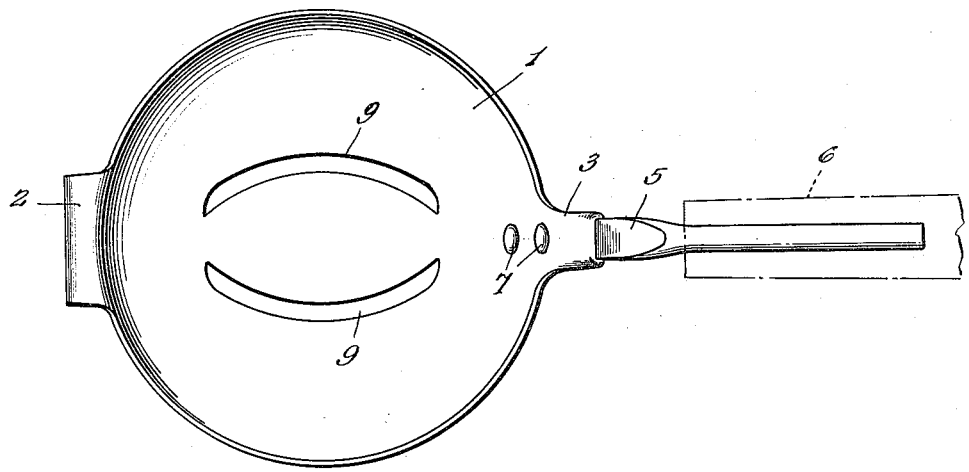
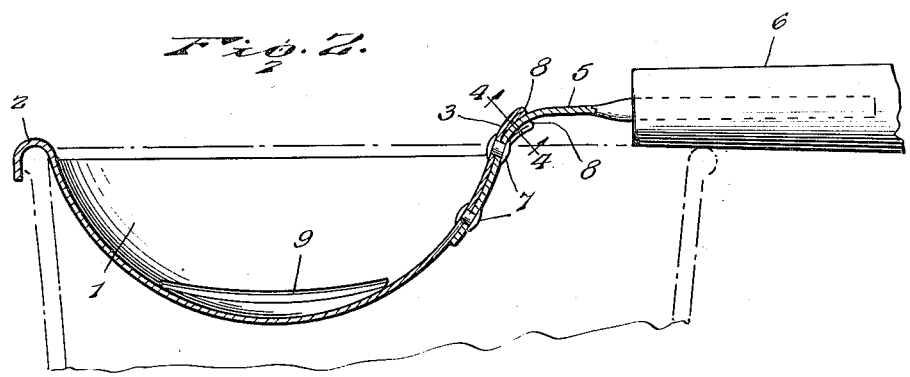
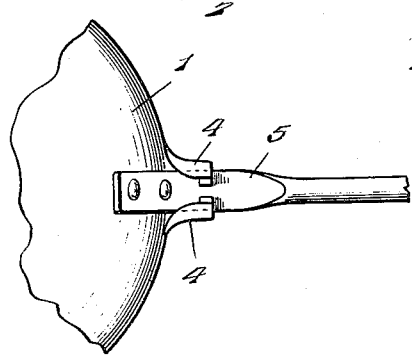
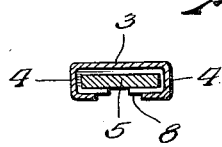
Inventor
George Gray.
By Lacey & Lacey, Attorneys Patented Mar. 24, 1936

2,035,065

UNITED STATES PATENT OFFICE 2,035,065

EGG SEPARATOR

George Gray, Le Roy, N. Y.

Application June 25, 1934, Serial No. 732,337

1 Claim. (Cl. 146—2)

This invention seeks to provide a very simple and inexpensive device by the use of which the whites and yolks of eggs may be very easily and efficiently separated. The invention is illustrated in the accompanying drawing and consists in certain novel features which will be particularly defined in the claim following a detailed description.

In the drawing:

Figure 1 is a plan view of an egg separator embodying the invention.

Figure 2 is a longitudinal section thereof showing the device in position upon a cup or bowl.

Figure 3 is a detail bottom plan view.

Figure 4 is a detail section on the line 4—4 of Figure 2.

The body of my egg separator consists of a cup or bowl 1 stamped from thin sheet metal and having tongues 2 and 3 formed integral therewith at diametrically opposite points. The tongue 2, as shown most clearly in Figure 2, is folded upon itself so as to form a hook which may engage over the edge of a cup or bowl or other receptacle and thereby aid in supporting the device. The tongue 3 is narrower than the tongue 2 and has foldable side portions, indicated at 4, which are adapted to be folded around the opposite side edges of a tang 5 and under the same so as to firmly position the body of the device relative to the tang 5 which may be inserted into a larger handle, as indicated at 6 by dotted lines, or may be utilized itself as a handle. It will be noted that the tang is bent to conform to the shape of the edge portion of the bowl or cup 1 and the tongue 3 and be secured thereto by rivets or similar fastenings 7. The edge portions of the tongue 3 may be folded upon themselves, as indicated at 8, so that sharp edges will be avoided and the device will be reinforced at its point of engagement with the tang. In the bottom of the bowl or cup 1 and at opposite sides of the center thereof are formed arcuate narrow slots 9, as shown.

In use, the bowl or cup 1 is placed over a receptacle, as indicated in Figure 2, with the handle 6 or tang 5 resting upon the edge of the receptacle at one point and the tongue 2 engaging over the edge of the receptacle at a diametrically opposite point. The shell of the egg is then broken and the contents thereof are deposited in the bowl whereupon the yolk will settle in the bottom of the bowl between the slots 9 and the white will overflow through the slots and drop into the receptacle upon which the bowl rests. The edges of the slots 9 will serve as knives to effect a clean and complete separation of the white from the yolk and the separation will be effected in a very convenient manner.

The device is inexpensive and may be readily stamped from sheet metal which will assume the desired form. The provision of a separate handle or tang secured to the bowl or body of the device will reinforce the device at the handle so that it may be very conveniently manipulated and cleaned when necessary without being apt to cut the fingers or hand of the user.

Having thus described the invention, I claim:

A device for the purpose set forth comprising a body provided with arcuate slots, tongues on the edge of the body at diametrically opposite points, one of said tongues forming a hook adapted to engage over the edge of a receptacle, and a handle member secured against the outer side of the bowl at the other tongue, the edge portions of said tongue being folded upon themselves and across the edges of the handle member and under the bottom of the same.

GEORGE GRAY.